United States Patent [19]

Nishimura

[11] Patent Number: 4,503,461
[45] Date of Patent: Mar. 5, 1985

[54] MULTIPLE MEASUREMENT NOISE REDUCING SYSTEM USING SPACE-VARIANT FILTERS

[75] Inventor: Dwight G. Nishimura, Palo Alto, Calif.

[73] Assignee: The Board of Trustees of the Leland, Stanford Junior University, Palo Alto, Calif.

[21] Appl. No.: 468,657

[22] Filed: Feb. 22, 1983

[51] Int. Cl.³ .......................... H04N 5/32; H04N 1/40
[52] U.S. Cl. ..................................... 358/111; 358/282; 358/284; 378/92; 378/99; 364/414; 128/653
[58] Field of Search ................... 358/93, 111, 36, 167, 358/282, 284; 378/92, 97, 99, 115; 364/414; 128/653, 659

[56] References Cited

U.S. PATENT DOCUMENTS 4,445,226  4/1984  Brody ..................................... 378/99
4,463,375  7/1984  Macovski .............................. 358/111

Primary Examiner—Howard W. Britton
Assistant Examiner—John K. Peng
Attorney, Agent, or Firm—Flehr, Hohbach, Test, Albritton & Herbert

[57] ABSTRACT

Extraneous signals or artifacts are reduced in a multiple measurement noise reducing system such as an X-ray imaging system by processing a plurality of measurements to obtain a first image signal of an object representing a desired parameter such as a blood vessel, processing the plurality of measurements to provide a second image signal having increased signal-to-noise, low pass filtering the first image signal, high pass filtering the second image signal, and then combining the two filtered signals. The filter frequencies are varied in response to the presence of artifacts to minimize effects of the artifact on the combined signal.

13 Claims, 4 Drawing Figures

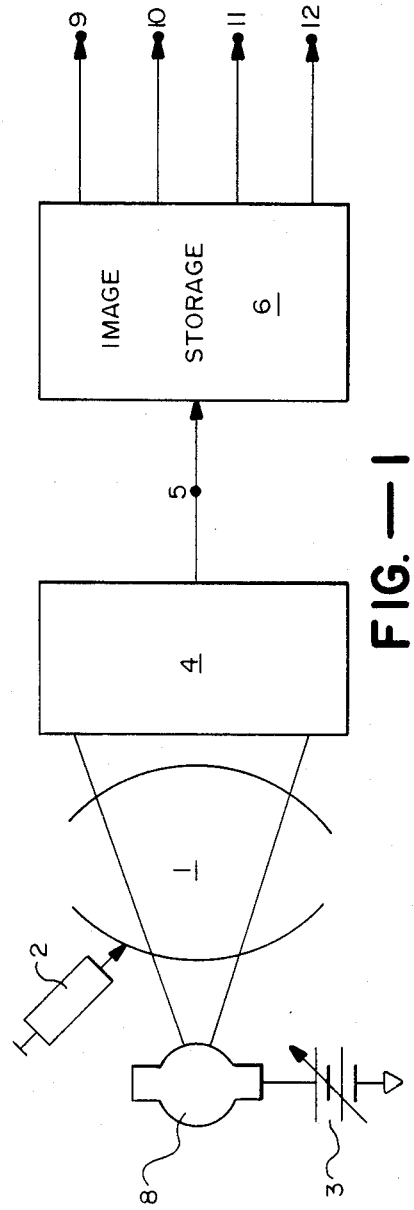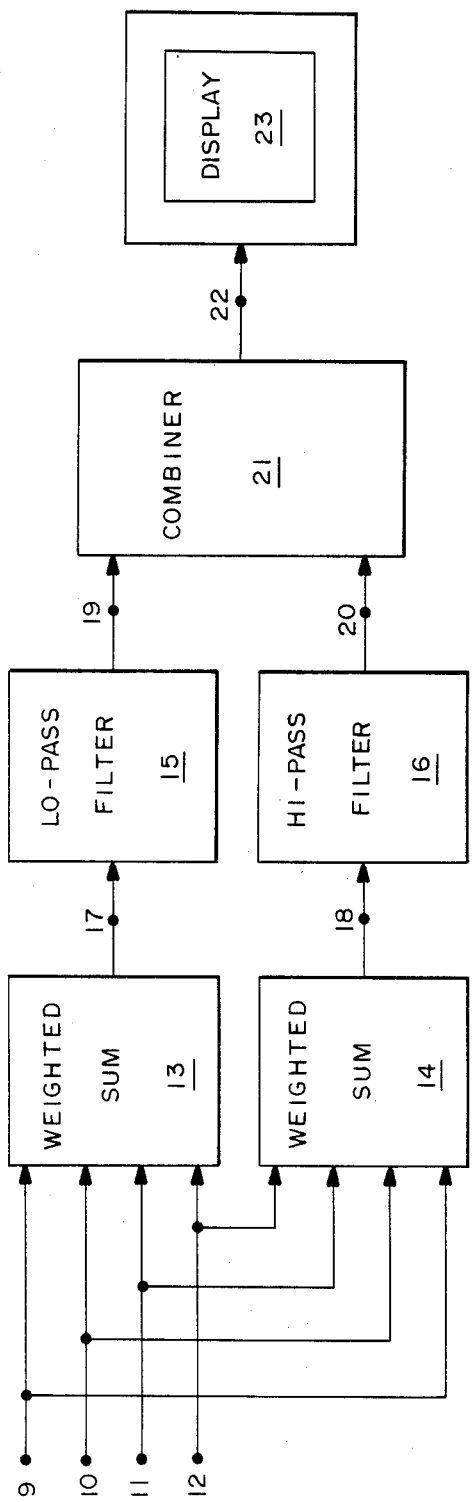
FIG.—1
FIG.—2

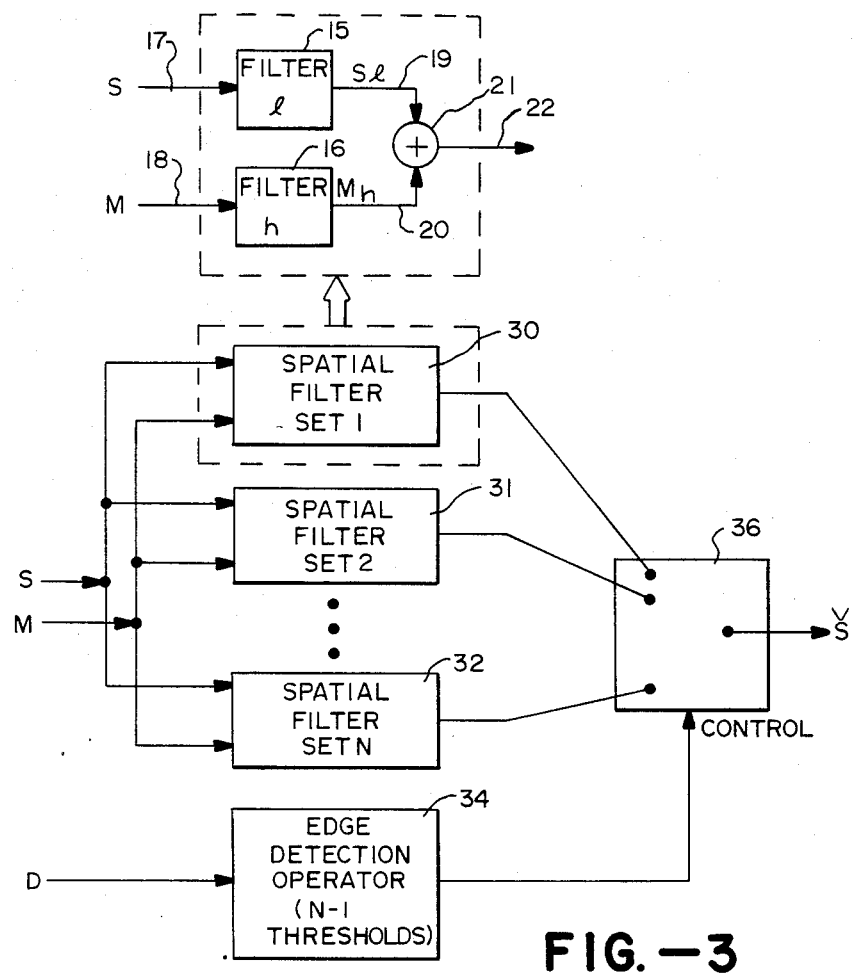
FIG.—3
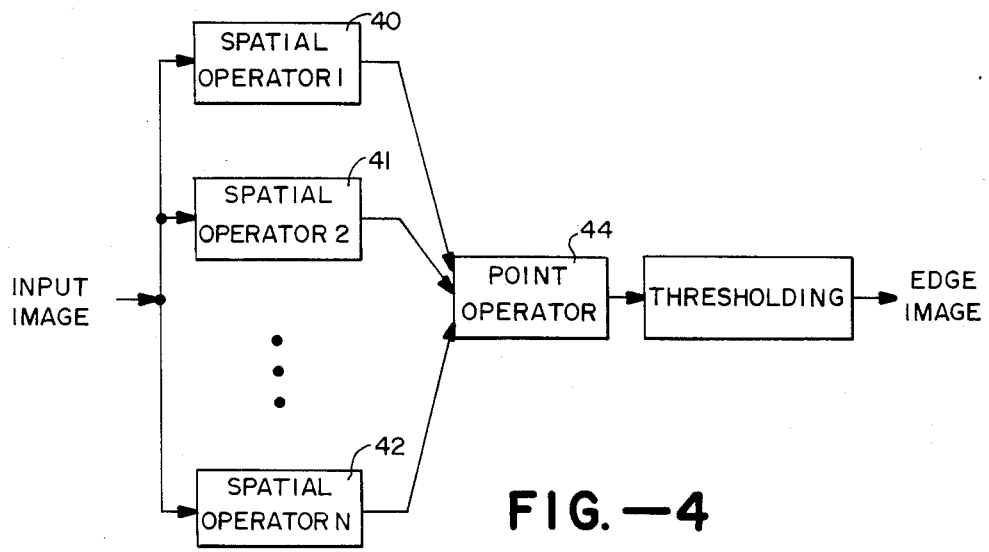
FIG.—4

MULTIPLE MEASUREMENT NOISE REDUCING SYSTEM USING SPACE-VARIANT FILTERS

This invention relates generally to imaging systems such as X-ray systems, and more particularly the invention relates to the processing of images derived from a plurality of measurements.

In many imaging application areas, images are constructed as a weighted sum of a plurality of measurements. A prime example are the recent new developments in X-ray imaging. Here measurements are made at different energies and/or at different times. These measurements are then combined to provide selective images representing specific materials.

One example is that of temporal subtraction techniques using digital radiography as described in the publication by C. A. Mistretta and A. B. Crummy, "Diagnosis of Cardiovascular Disease by Digital Subtraction Angiography," in *Science*, Vol. 214, pp. 761–65, 1981. Here measurements taken before and after the administration of iodine into blood vessels are subtracted to provide an image of vessels alone. Another example is that of energy-selective radiography as described in the publication by L. A. Lehmann, et al., "Generalized Image Combinations in Dual KVP Digital Radiography," in *Medical Physics*, Vol. 8, pp. 659-67, 1981. Here measurements made at different energies are combined to enhance or eliminate specific materials. A third example is energy-selective computerized tomography as described in the publication by R. E. Alvarez and A. Macovski, "Energy-Selective Reconstructions in X-ray Computerized Tomography," in *Physics in Medicine & Biology*, Vol. 21, pp. 733-744, 1976. Here sets of measurements are made at two energy spectra and distortion-free reconstructions are made which delineate the average atomic number and density of each region. A fourth example is hybrid subtraction described in U.S. application Ser. No. 6,260,694, filed 5/5/81 and in the publication by W. R. Brody, "Hybrid Subtraction for Improved Intraveous Arteriography," in *Radiology*, Vol. 141, pp. 828-831, 1981. Here dual energy measurements are made before and after the administration of iodine. Each dual energy pair is used to eliminate soft tissue. In this way the resultant subtracted vessel images are immune to soft tissue motion.

In each case, where a number of measurements are combined to select specific material properties, the resultant SNR (Signal-to-noise ratio) is reduced as compared to the nonselective image. Therefore, these various processing techniques which improve the visualization of disease processes by selecting specific materials have the disadvantage of a reduction in SNR. This reduced SNR can interfere with the ability to visualize regions of disease.

A system to improve the SNR of the hybrid subtraction and other multiple measurement systems has been developed by A. Macovski and is dislcosed in U.S. patent application Ser. No. 415,334 filed Sept. 7, 1982 for "Multiple Measurement Noise Reducing System." An array of measurements are taken of an object under different conditions. These are combined to select a specific aspect of the object. The same measurements are then combined in different weightings to provide a lower-noise image, without the desired selectivity. The improved selective image is formed by combining the selective image with the lower-noise image using the lower frequency components of the former and the higher frequency components of the latter. To assure the proper amplitude of the higher frequency components, the components are weighted such as with the ratio of the derivative of the selective image to the derivative of the lower-noise image. Nonlinear thresholds are used for those cases where this ratio becomes an unreliable indicator of the correct amplitude of the high frequency components. One limitation of the Macovski system is the introduction of extraneous signals (herein termed "artifacts") by the low noise signal.

The present invention is directed to an improvement in the Macovski system by minimizing the artifacts introduced in the displayed image. In accordance with the invention, a space-variant filter is applied to a selective image signal, S, and the complementary space-variant filter to a lower noise image signal, M. The sum of these two filtered images appropriately scaled results in the improved image $$\overset{\Delta}{S}.$$

This process still combines the low frequency components of S with the high frequency components of M, but the spatial frequency distribution of the filter response varies with the picture element. The procedure may be expressed by $$\overset{\Delta}{S} = S_{l(*)} + M_{h(*)}$$

where $S_{l(*)}$ and $M_{h(*)}$ represent the two filtered images, $l(*)$ the space-variant filter, and $h(*)$ the complementary space-variant filter. Because the two filters are always complementary and the combination is linear, an important property is that the desired signal component is never distorted in the processed image. In the original NRS, distortion is possible in the form of blurring when the weighting of the high pass filtered M image ($M_h$), which contains the edge information, becomes small to prevent artifact edges from entering the enhanced image. In the improved system, the filter used at each picture element is chosen to suppress the amount of high frequency artifact that leaks into the processed image without undue sacrifice of the SNR.

Accordingly, an object of the present invention is a multiple measurement noise reducing system which minimizes extraneous artifacts.

Another object of the invention is a method of improving the image in a multiple measurement noise reducing system.

A feature of the invention is the use of space-variant filters in obtaining signal components.

The invention and objects and features thereof will be more readily apparent from the following detailed description and appended claims when taking with the drawing, in which:

FIG. 1 is a block diagram of an X-ray system for acquiring signals useful in the invention.

FIG. 2 is a block diagram of an X-ray system in accordance with the prior art.

FIG. 3 is a functional block diagram of an X-ray system in accordance with the present invention.

FIG. 4 is a functional block diagram of edge detection circuitry useful with the system of FIG. 3.

Referring now to the drawings, FIG. 1 is a block diagram of an X-ray system which includes an X-ray tube 8 supplied by variable voltage power source 3. The x-rays are transmitted through object 1, normally the human anatomy. The transmitted rays are received by x-ray detector 4, such as an image intensifier and television camera, or a one- or two-dimensional array of scintillators, etc. The image signal 5 is applied to storage system 6 where a plurality of images 9, 10, 11, 12, etc., can be stored.

In temporal subtraction a first image 9 is stored. Following administration of a contrast agent using syringe 2, a second image 10 is stored. These are then used in the subsequent processing systems. In energy selective systems, images 9, 10, 11, 12, etc., are stored at different values of beam energy corresponding to different anode voltages 3. In dual-energy systems, two voltages are used. In addition different X-ray beam filters, not shown, can be added.

In the Brody hybrid subtraction system previously described, measurements at two voltages are taken prior to the administration of contrast material. These are stored as 9 and 10. Following administration of the contrast agent, two additional measurements at the same two voltages are taken and stored as 11 and 12. These four measurements are then processed to obtain a low-noise image of the vessels opacified by the contrast material from syringe 2.

Referring now to FIG. 2, the lines 9, 10, 11 and 12 representing an array of X-ray measurements of an object, are processed in accordance with the Macovski system described above. These signals could be obtained, for example, from the output of the television camera in a fluoroscopic system where an array of images are formed and stored, for example, on a magnetic disc or in a solid-state frame memory. These signals can represent X-ray images taken with different photon energy spectra or taken before and after the administration of a contrast agent.

In general the multiple measurements are taken so as to provide the isolation or elimination of specific materials. One simple example involves the isolation of vessel images by subtracting measurements taken before and after the administration of an iodinated contrast agent. Other examples include measurements at different X-ray photon energy spectra which are then combined to eliminate or enhance specific materials.

Weighted summer 13 takes the measurements and provides selective signal 17, containing the desired material properties. Unfortunately, however, signal 17 often has relatively poor SNR. The weighted sum usually involves negative weights which diminish the signal. The noise variances of each independent measurement add, however, to provide a large variance, hence a low SNR. This SNR is considerably improved using low pass filter 15 which reduces the bandwidth. This noise reduction, however, is accomplished at the price of reduced resolution. A primary objective of this invention is to restore the resolution using a source of high frequency information with reduced noise.

Signals 9, 10, 11 and 12 are also applied to weighted summing structure 14. These weights can be chosen to maximize the signal-to-noise ratio for a particular component of the image. For example, for vessel imaging they can be chosen to maximize the signal-to-noise ratio for the iodinated contrast agent. This is in sharp distinction to weighted summing structure 13 where the weights are chosen to isolate iodine and eliminate the various tissue components. Ideally, the weights which maximize the SNR will vary in different portions of the image, depending on the intervening tissue. Thus, the weights can be varied as the signals are scanned. However, for simplicity, the weights can be fixed to maximize the average SNR with relatively small degradation in performance.

The high SNR weighted-sum signal, 18, is applied to high pass filter 16 which extracts the high frequency components. A preferred embodiment of this high pass filter is the complement of low pass filter 15. Thus the sum of the normalized transmissions equals unity within the frequencies of interest. These filters can either be implemented in the frequency domain or as convolution functions.

Combiner 21 combines the low frequency image or signal 19 with the high frequency image or signal 20 to obtain the processed image 22 which is displayed in display 23. Since signal 19 is low noise because of the filtering, and signal 20 is low noise because of the weightings, the processed signal 22 is a low noise version of the desired signal, having the full bandwidth or resolution.

The degree of artifacts in the image can depend on the nature of the combiner 21. For simplicity, the combiner 21 can simply be an adder. Here the desired selected image will have the required low noise and high resolution. However, signal 20 contains the high frequency components of undesired structures. For example, in vessel images, signal 20 contains the edges of undesired structures such as bone and various soft tissue organs and motion artifacts. Since these are only edges, however, a trained radiologist can ignore them and concentrate on the vessels.

This system is particularly applicable to the previously-described hybrid subtraction scheme. Assume summer 13 weights the four signals to eliminate everything but iodine, while also subtracting soft tissue motion artifacts. Summer 14 can, for example, weight the signals to provide a low noise temporal subtraction, without concern about soft tissue motion artifacts. This can be accomplished by using a large positive weight for the low energy signal before iodine is administered, and a smaller positive weight for the high energy signals since it contains less of the iodine component. These weights are reversed for the measurements taken after the iodine administration to provide a temporal subtraction of everything except iodine.

In this case, in the absence of motion, when 19 and 20 are added, the desired isolated vessel signal will be formed having its full resolution. In the presence of soft tissue motion, signal 19 will be immune and continue to be vessels only, as described in the previously referenced application on hybrid subtraction. Low noise signal 20, however, will contain motion artifacts. Thus when they are added in combiner 21, the edges of these artifacts will be present.

In accordance with the present invention, the multiple measurement noise reducing system of Macovski is modified to suppress the high frequency artifacts without undue sacrifice of the SNR. Whereas the Macovski system varies the weighting of the $M_h$ component to handle the presence of artifact edges, the present invention varies the filtering of the low frequency and high frequency signal components. In the image areas where artifact edges would otherwise appear using a space invariant filter, the filter applied on the signal S has a wider spatial bandwidth and therefore the complementary filter applied on the signal component M has a narrower bandwidth. Consequently, the composite signal sacrifices the SNR in the artifact-edge regions, but suppresses the presence of that artifact edge because the combined signal receives relatively few of its frequency components from the artifact-laden signal M. In those areas where broad regions of artifact reside, the filter applied to the signal S possesses a relatively narrow spatial bandwidth to filter the noise significantly. Thus, the combined signal obtains most of its frequency components from the lower noise signal M.

FIG. 3 is a functional block diagram illustrating the noise reducing system in accordance with the invention. The system comprises a plurality of spatial filter sets 30, 31, and 32, each of which comprises a low pass filter 15, high pass filter 16, and combiner 21 (shown in FIG. 2) as illustrated. Thus, the selective signal, S, 17 and the low noise signal, M, 18 are applied to each of the spatial filter sets 30-32. The appropriate filter for each picture element is selected from this bank of memories according to the degree of artifact edge present. The severity of artifact edge is measured by using an image of the artifact found in signal M. This image, denoted D, may be a third combination of the original measurements, such as derived by subtracting S from M with the appropriate scaling. The signal D is applied to an edge detection operator having N thresholds where N is the number of spatial filters in FIG. 3, and the output of the edge detector operator is applied to a switch 36 for selecting the spatial filter set for each picture element.

FIG. 4 is a functional block diagram of one embodiment of the edge detector operator 34 and includes a plurality of derivative operators 40, 41, and 42 each receiving the input image, D, in the horizontal and vertical directions to provide the two components of the spatial gradient vector. The magnitude of the gradient vector at each point as derived by the point operator 44 is then compared with thresholds for each spatial filter set. The higher the threshold level exceeded by the edge image, the wider the spatial bandwidth of the filter applied to the signal S and the narrower the spatial bandwidth of the filter applied to the signal M. Other edge map techniques can be employed such as template filters known in the art to detect edge orientation and strength.

There has been described an improved multiple measurement noise reducing system in which the filtering of two signal components are spatially varied to minimize the presence of extraneous artifacts. By detecting the edges of an artifact through use of spatial operators and then adjusting the filtering of the two composite signals, an improved signal with minimal distortion due to artifact edges is provided. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. For use in an imaging system, a method of reducing extraneous signals in a first processed image signal of an object representing a desired parameter derived from a plurality of measurements comprising the steps of:
   processing said plurality of measurements to provide a second processed image signal having greater signal-to-noise ratio than said first processed signal,
   low pass filtering said first processed image signal to reduce its noise,
   high pass filtering said second processed image signal, said high pass filtering being complementary to said low pass filtering;
   varying the filter frequencies of said low pass filtering and said high pass filtering in response to presence of artifacts, and
   combining said filtered first processed image and said filtered second processed image to provide an improved processed image signal.

2. The method as defined by claim 1 wherein said step of varying the filter frequencies includes the step of determining the spatial location of extraneous artifact edges in said second processed image signal and increasing the bandwidth frequency of said low pass filtering and reducing the bandwidth of said high pass filtering when an artifact edge is detected.

3. The method as defined by claim 2 wherein said step of determining the spatial location of extraneous artifact edges includes determining the components of the spatial gradient signal vector of the difference between said first processed image signal and said second processed image signal.

4. The method as defined by claim 1 wherein said first processed image signal is derived from a first weighted sum of said measurements and said second processed image signal is derived from a second weighted sum of said measurements.

5. The method as defined by claim 4 wherein said imaging system comprises an X-ray system and said measurements are at different X-ray energies.

6. The method as defined by claim 4 wherein said imaging system comprises an X-ray system and said measurements are at different times.

7. In an imaging system, apparatus for reducing extraneous image signals in a processed image signal of an object representing a desired parameter derived from a plurality of measurements comprising:
   first processing means for processing said plurality of measurements and producing a first processed image signal representing said desired parameter,
   second processing means for processing said plurality of measurements and producing a second processed image signal having a greater signal-to-noise ratio than said first processed image signal,
   first filter means for receiving and low pass filtering said first processed image signal,
   second filter means for receiving and high pass filtering said second processed image signal,
   means for varying the filter bandwidths of said low pass filter means and said high pass filter means in response to presence of extraneous image signals, and
   means for combining said filtered first processed image signal and said filtered second processed image signal.

8. Apparatus as defined by claim 7 wherein said first filter means and said second filter means are complementary in frequency.

9. Apparatus as defined by claim 8 wherein said means for varying the filter frequencies includes means for determining the spatial location of edges of extraneous images in said second processed image signal and increasing the bandwidth frequencies of said low pass filter means and decreasing the bandwidth frequencies of said high pass filter means when an edge of an extraneous image is detected.

10. Apparatus as defined by claim 9 wherein said means for determining the spatial location of edges includes differential means for determining the components of the spatial gradient signal vector of the difference between said first processed image signal and said second processed image signal.

11. Apparatus as defined by claim 7 wherein said first processed image signal is derived from a first weighted sum of said measurements and said second processed image signal is derived from a second weighted sum of said measurements.

12. Apparatus as defined by claim 11 wherein said imaging system comprises an X-ray system and said measurements are at different X-ray energies.

13. Apparatus as defined by claim 11 wherein said imaging system comprises an X-ray system and said measurements are at different times.

* * * * *

UNITED STATES PATENT AND TRADEMARK OFFICE
CERTIFICATE OF CORRECTION

PATENT NO. : 4,503,461
DATED : March 5, 1985
INVENTOR(S) : Dwight G. Nishimura

It is certified that error appears in the above-indentified patent and that said Letters Patent is hereby corrected as shown below:

Column 1, after the title, insert the following paragraph:

--This invention was made with Government support under contract Nos. 87207, N01-CM17485, and HV02922 awarded by the Public Health Services. The Government has certain rights in this invention.--

Signed and Sealed this

Thirteenth Day of December, 1994

Attest:

BRUCE LEHMAN

Attesting Officer   Commissioner of Patents and Trademarks